(12) United States Patent
Lin et al.

(10) Patent No.: US 9,659,141 B2
(45) Date of Patent: May 23, 2017

(54) EDA TOOL AND METHOD FOR CONFLICT DETECTION DURING MULTI-PATTERNING LITHOGRAPHY

(71) Applicant: Taiwan Semiconductor Manufacturing Co., Ltd., Hsin-Chu (TW)

(72) Inventors: Yen-Hung Lin, Hsinchu (TW); Cheng-I Huang, Hsinchu (TW); Chin-Chang Hsu, Banqiao (TW); Hung Lung Lin, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 14/833,364

(22) Filed: Aug. 24, 2015

(65) Prior Publication Data
US 2015/0363541 A1    Dec. 17, 2015

Related U.S. Application Data

(62) Division of application No. 14/187,421, filed on Feb. 24, 2014, now Pat. No. 9,141,752.

(60) Provisional application No. 61/781,098, filed on Mar. 14, 2013.

(51) Int. Cl.
     *G06F 17/50*      (2006.01)

(52) U.S. Cl.
     CPC ...... *G06F 17/5081* (2013.01); *G06F 2217/06* (2013.01)

(58) Field of Classification Search
     CPC .......................................................... G06F 17/50
     USPC ................................................................ 716/52
     See application file for complete search history.

(56) References Cited

U.S. PATENT DOCUMENTS

| 8,484,607 | B1 | 7/2013 | Tang et al. |
| 8,601,409 | B1 | 12/2013 | Chen et al. |
| 2011/0078638 | A1 | 3/2011 | Kahng et al. |
| 2011/0271238 | A1* | 11/2011 | Mansfield ............... G03F 7/203 716/55 |
| 2012/0216157 | A1 | 8/2012 | Luo et al. |
| 2013/0074018 | A1* | 3/2013 | Hsu ........................... G03F 1/70 716/55 |
| 2013/0074024 | A1 | 3/2013 | Chase et al. |
| 2014/0007026 | A1* | 1/2014 | Chen ................... G06F 17/5072 716/55 |

\* cited by examiner

*Primary Examiner* — Thuan Do
(74) *Attorney, Agent, or Firm* — Duane Morris LLP

(57) ABSTRACT

A method includes accessing data representing a layout of a layer of an integrated circuit (IC) having a plurality of polygons defining circuit patterns to be divided among a number (N) of photomasks over a single layer of a semiconductor substrate, where N is greater than two. The method further includes inputting a conflict graph having a plurality of vertices, identifying a first and second vertex, each of which is connected to a third and fourth vertex where the third and fourth vertices are connected to a same edge of a conflict graph, and merging the first and second vertices to form a reduced graph. The method further includes detecting at least one or more vertex in the reduced having a conflict. In one aspect, the method resolves the detected conflict by performing one of pattern shifting, stitch inserting, or re-routing.

20 Claims, 16 Drawing Sheets

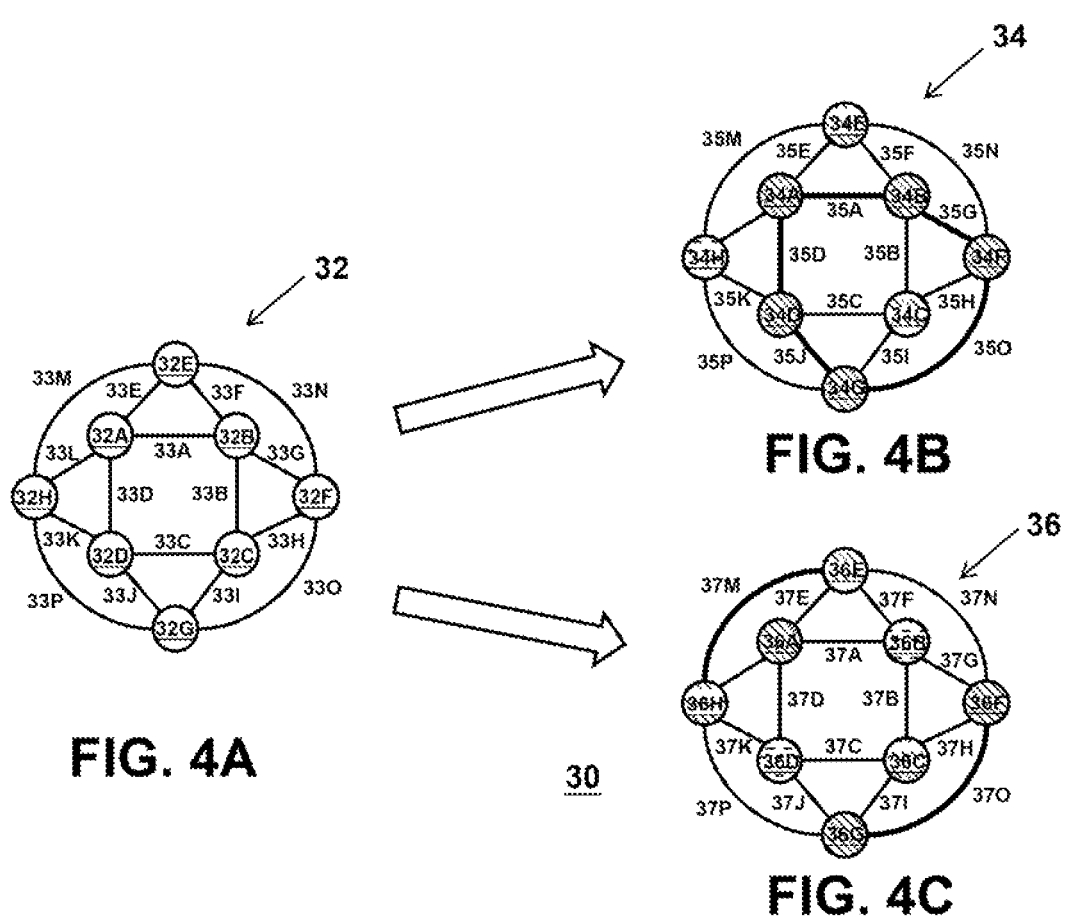

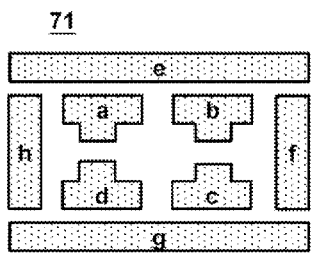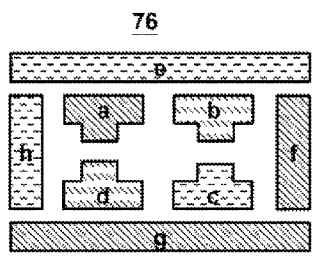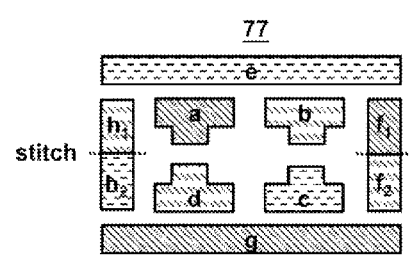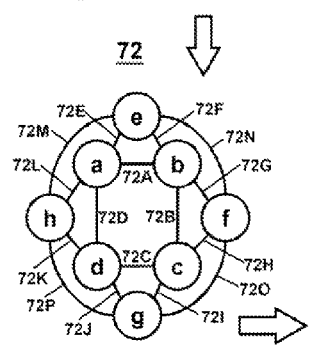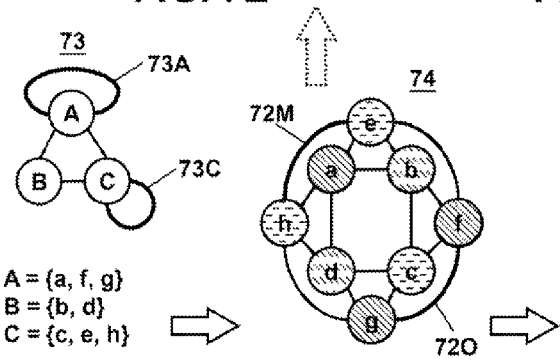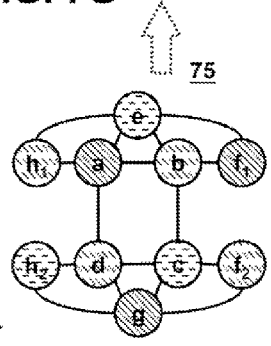
FIG. 7A  FIG. 7E  FIG. 7G
FIG. 7B  FIG. 7C  FIG. 7D  FIG. 7F
A = {a, f, g}
B = {b, d}
C = {c, e, h}

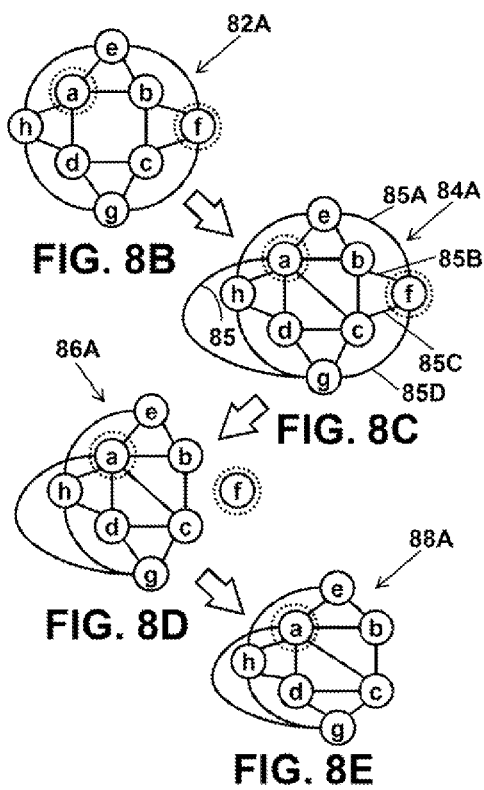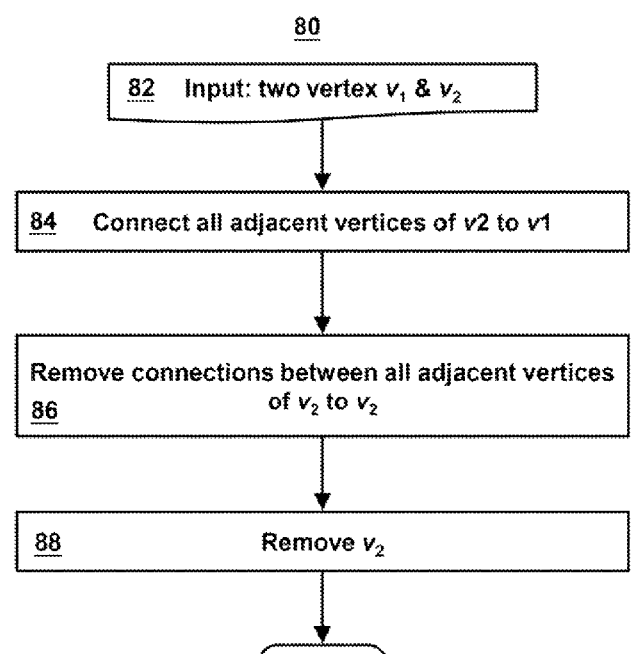
FIG. 8B
FIG. 8C
FIG. 8D
FIG. 8E
FIG. 8A

EDA TOOL AND METHOD FOR CONFLICT DETECTION DURING MULTI-PATTERNING LITHOGRAPHY

This application is a division of U.S. patent application Ser. No. 14/187,421, filed Feb. 24, 2014, which claims the benefit of U.S. Provisional Patent Application No. 61/781,098, filed Mar. 14, 2013, both of which are expressly incorporated by reference herein in their entireties.

FIELD

This disclosure relates generally to semiconductor fabrication, and more specifically to multi-patterning of semiconductor substrates.

BACKGROUND

In semiconductor fabrication processes, the resolution of a photoresist pattern begins to blur at about 45 nanometer (nm) half pitch due to diffraction. To continue to use fabrication equipment purchased for larger technology nodes, multi-exposure methods have been developed.

Multiple exposure or multi-patterning technology (MPT) involves forming patterns on a single layer of a substrate using two or more different masks in succession. If only two masks are used for patterning a layer, the technique is referred to as double exposure. One form of double exposure is referred to as double patterning technology (DPT). In DPT, first and second masks are used sequentially to pattern the same layer. As long as the patterns within each mask comply with the relevant minimum separation distances for the technology node, the combination of patterns formed using both masks may include smaller separations than the minimum separation distance. MPT allows line segments, and in some cases, more complex shapes to be formed of a vertical segment and a horizontal segment on the same mask. Thus, MPT provides flexibility and generally allows for significant reduction in overall IC layout.

MPT is a layout splitting method analogous to an M-coloring problem for layout splitting in graph theory, where M is the number of masks used to expose a single layer (and M also equals the number of exposures of photoresist over the single layer of the substrate, where each exposure is performed using a respectively different mask). For example, if two masks are to be used (double patterning, DPT), it is customary to refer to the patterns as being assigned one of two "color types", where the color corresponds to a photomask assignment.

An MPT native conflict exists for a given number of photomasks, when there is no way to assign all the circuit patterns to the given number of photomasks, without violating minimum separation design rules. There will be at least two circuit patterns assigned to the same one of the photomasks, such that those two circuit patterns remain closer to each other than the minimum separation distance determined by design rules for a given technology node. For example, in the case of MPT with three photomasks for exposing a single layer (triple patterning technology, TPT), there is a triple patterning native conflict if there is no way to divide the circuit patterns of that layer among three masks without violating the minimum separation distance design rule in at least one of the three masks. The designer can resolve the MPT conflict without increasing the number of masks by making a change to the layout.

BRIEF DESCRIPTION OF THE DRAWINGS

FIGS. 4A-4C illustrate conflicts using a conflict graph according to an embodiment.

FIGS. 7A-G depict a graphical representation of various steps of the method of FIG. 4 or 5 in accordance with an embodiment.

FIGS. 8A-E depict a flow chart and corresponding conflict charts illustrating a method of merging color conformable vertices in accordance with an embodiment.

DETAILED DESCRIPTION

Figure 1:
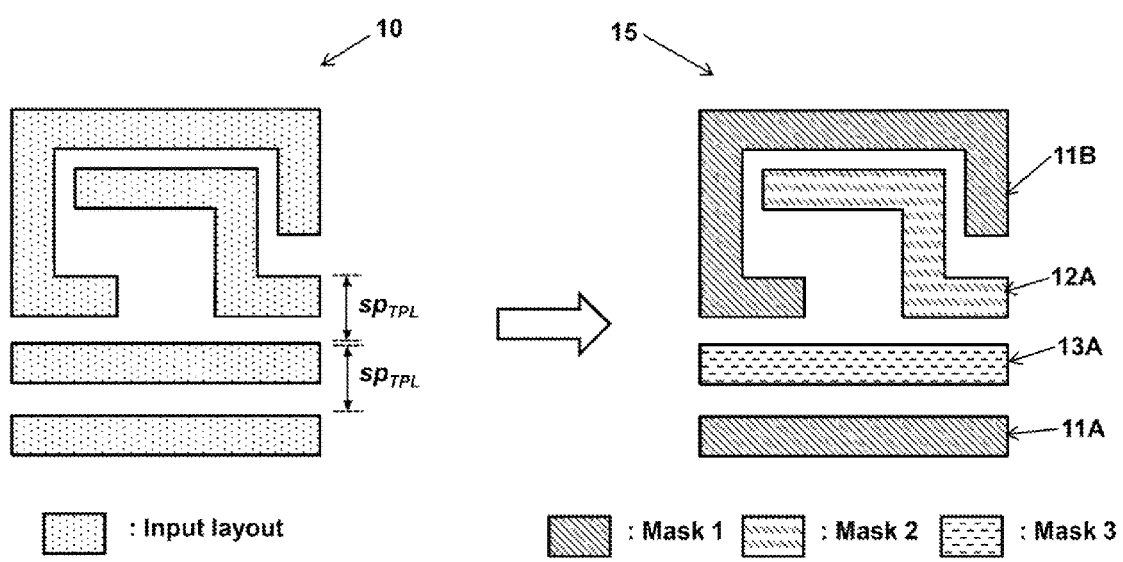
FIG. 1 and FIG. 2 show plan views of polygons formed by photomasks formed by MPT and more particularly using triple patterning lithography (TPL) according to an embodiment.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation.

Integrated circuits are fabricated by photolithographic techniques, including forming conductive lines and shapes (such as, but not limited to, copper lines in an interconnect layer of an IC, or a diffusion region in an active device layer of the IC). These conductive lines and shapes are generally referred to as patterns or polygons. Using photolithography to form these patterns is also referred to as "patterning." At geometries smaller than the 45 nm technology node, diffraction effects make it difficult to clearly expose closely spaced patterns in photoresist using a single exposure with existing 193 nm laser equipment. Methods in which a single layer of an IC is exposed with two or more photomasks are referred to as multi-patterning. Multi-patterning techniques can extend the useful life of expensive 193 nm photolithography equipment. Multi-patterning methods include double patterning (two masks per layer) or triple patterning (three masks per layer), for example.

In general, a layer of an IC can be successfully exposed by triple patterning if the patterns in that layer can be divided (assigned) among three different masks. such that within each individual mask, no two patterns are closer to each other than a minimum separation distance (defined by a technology node dependent design rule). For ease of visualization, patterns assigned to respectively different masks used to expose the same layer are often drawn in respectively different colors. Thus, the set of patterns assigned to be exposed in the photoresist using a given mask is referred to as being assigned the same "color." In some embodiments of programmed computer implementations of the method described herein, a display device displays all circuit patterns assigned to a single photomask using the same color.

In some cases, a proposed division of the patterns among three different masks results in one mask having two patterns closer to each other than a minimum separation distance, a situation referred to as a conflict. Some conflicts can be resolved by re-assigning a pattern to a different photomask. If, however, there is no way to divide the patterns of that layer among three different masks without having two patterns in a single mask closer to each other than the minimum separation distance, there is a native triple patterning conflict. Native conflicts can be resolved by a design (layout) change, or an advanced technique, such as splitting a single circuit pattern into two abutting parts, each to be patterned by a respective mask, and stitched together.

A minimum separation between adjacent patterns to be formed clearly by a single photomask is determined from the design rules and technology file for the process being used. The term "minimum separation for triple patterning" is used herein to refer to the minimum separation (according to the design rules) for triple patterning lithography, and is also abbreviated below as SPtpl or G0. A separation smaller than SPtpl is called a sub-SPtpl or sub-G0 distance. The minimum separation SPtpl or G0 between any given two polygons depends both on the technology node (e.g., 20 nm, 14 nm) and the geometry between the polygons (e.g., run-to-run, end-to-end, end-to-run). For each sequence of separating adjacent polygons by distances smaller than the applicable SPtpl or G0 distance, the mask assignments can initially be made round robin. Thus, for TPL, the initial assignments to six polygons separated by sub-SPtpl or sub-G0 distances to three masks (designated "A," "B," and "C", for example) can be A-B-C-A-B-C.

One solution for resolving native conflicts includes increasing the separation between two of the patterns assigned to the same mask. and stitching. Referring to the TPL example of FIG. 1, three masks are used to expose one layer in an input layout 10. A first mask forms patterns 11A and 11B, a second mask forms pattern 12A, and a third mask forms pattern 13A. Two patterns whose spacing is less than the minimum separation distance SPtpl, such as the patterns 11B and 12A are assigned to different masks.

Figure 3:
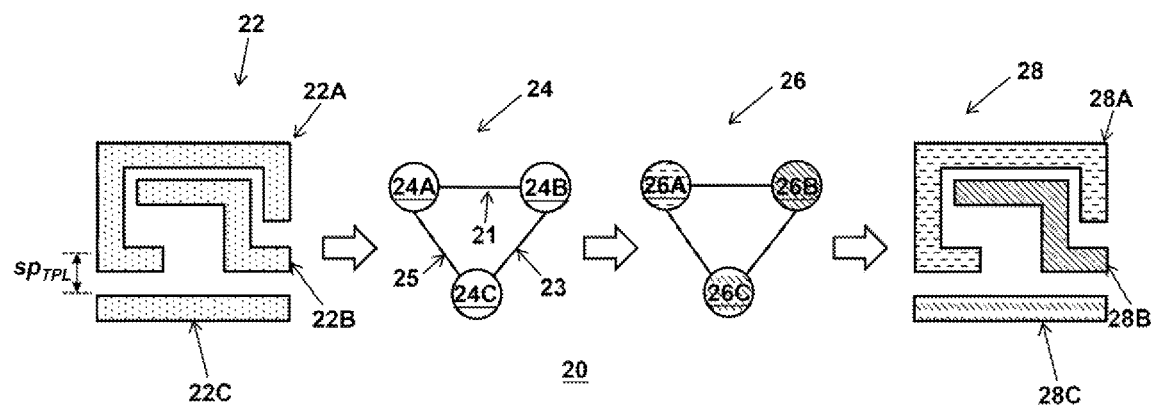
FIG. 3 shows a decomposition of a layout of an IC into three masks for TPL according to an embodiment.

Note that the various patterns formed by masks 11, 12, and 13 in FIG. 1 and in FIGS. 3 and 7 show a simple example of a method for distributing polygons (representing circuit patterns) among three or more masks. For example, the layout 15 can have a first mask 11, a second mask 12, and a third mask 13 that form the polygons representing circuit patterns. This layout does not have a native triple patterning conflict, because the four patterns can be assigned to three photomasks, such that none of the masks has two patterns separated by a distance smaller than the minimum separation distance.

Figure 2:
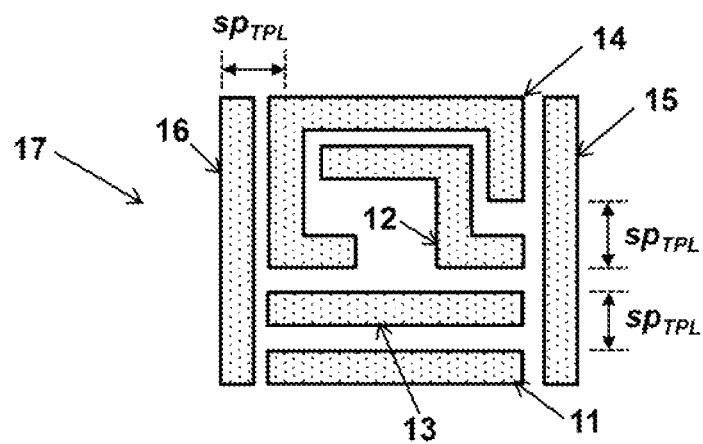

In contrast to the layout 15 of FIG. 1, the layout 17 of FIG. 2 includes a native triple patterning conflict since the six patterns 11-16 represented cannot be assigned to three photomasks without violating a minimum separation distance design rule. There is no combination of assignments of the six patterns 11-16 to three different masks, such that none of the masks has pair of patterns separated from each other by a distance smaller than the minimum spacing SPtpl.

For example, if pattern 16 is assigned to mask 1, and pattern 11 to mask 2, then pattern 13 must be assigned to mask 3 (because pattern 13 is separated from both pattern 16 (mask 1) and pattern 11 (mask 2) by less than SPtpl); and pattern 14 must be assigned to mask 2 (because pattern 14 is separated from both pattern 16 (mask 1) and pattern 13 (mask 3) by less than SPtpl). Pattern 12 must be assigned to mask 1, (because pattern 12 is separated by less than SPtpl from pattern 14 (mask 2) and pattern 13 (mask 3). Then pattern 15 cannot be assigned to any of the masks for clear patterning, because it separated by less than the SPtpl from pattern 11 (mask 2), pattern 13 (mask 3), and pattern 12 (mask 1).

According to some embodiments, a method detects TPL conflicts before assigning the patterns to photomasks (by analyzing the spacing between adjacent patterns of the input layout 22 of FIG. 3, for example). The method utilizes conflict graphs as further explained with reference to FIG. 4A-4C below to determine mask or color assignments suitable for a layout without conflicts. Using the technique described herein, the method reduces complexity in detecting TPL (or MPT) conflicts quickly and, reduces the number of TPL or MPT conflicts to assist designers in fixing violations. Applying integer linear programming (ILP) to detect TPL conflicts is inefficient due to the unacceptable runtime of applying ILP in other contexts.

Referring to FIG. 3, a process 20 of TPL layout decomposition is illustrated where a conflict graph (CG) 24 is used to show the spacing relation among all patterns in one layer. The input layout 22 is drawn in the conflict graph 24 with each vertex (24A, 24B, and 24C) corresponding to a respective circuit pattern (22A, 22B, and 22C) in the layout 22. The edges (21, 23, and 25) correspond to the sub-SPtpl spacings between vertices (24A and 24B, 24B and 24C, and 24C and 24A). Following assignment of the patterns to respective photomasks, the conflict graph 26 includes mask or color assignments of the three vertices. None of the vertices 24A, 24B, 24C is connected by an edge 21, 23, 25 to another vertex having the same color. This indicates that none of the circuit patterns is separated by less than the minimum separation distance SPtpl from another circuit pattern to be exposed on the substrate using the same photomask. A final representation of the layout 28 includes the color (mask) assignments for each circuit pattern 28A (mask 1), 28B (mask 2), and 28C (mask 3) corresponding to the three colored vertices (26A, 26B, and 26C) of conflict graph 26.

FIGS. 4A-C illustrate a TPL conflict detection example 30 using a single conflict graph 32 representing an input layout having vertices 32A-32H and edges 33A-33P. Note that in the discussion of FIGS. 4A-4C, the term "conflicts" refers to two patterns separated by less than the minimum separation design rule distance SPtpl. In some cases, a conflict can be resolved by reassigning one or more patterns to be formed by a different mask. The term "native conflict" refers to a layout for which there is no possible set of mask assignments without a conflict. Native conflicts can be resolved by layout changes. The layout and the input conflict graph 32 are initially provided without color or mask assignments. The solution involves minimizing the number of edges connecting pairs of vertices within the same mask. In one pattern 34 having vertices 34A-34-H and edges 35A-35P as shown in FIG. 4B, five (5) TPL potential conflicts are found as an example. The five TPL potential conflicts are represented by the edges 35A, 35G, 35O, 35J and 35D between the vertices 34A, 34B, 34F, 34G, 34D in the conflict graph 34. These are conflicts because patterns separated by less than the minimum distance are assigned to the same masks using triple patterning. These conflicts are not native conflicts as explained above. They are identified by finding two patterns assigned to the same mask as each other that are separated by a smaller distance than the minimum separation design rule for patterning using the same mask for a particular potential set of mask assignments, but the designer can select a different set of mask assignments to resolve or reduce the conflicts. For example, in FIG. 4C, for the same layout, only two TPL potential conflicts are found at edges 37O and 37M of the color pattern 36 having vertices 36A-36H and edges 37A-37P. These conflicts are indicated by adjacent patterns assigned to the same mask (e.g., adjacent vertices of the same color) and separated by a spacing smaller than SPtpl (represented by edges 35A, 35G, 35O, 35J and 35D in FIG. 4B or edges 37O and 37M in FIG. 4C).

The terms "triangular edge weight" (TEW) and "coloring conformable" are used herein to facilitate the conflict detection analysis. The TEW of one edge within a graph indicates the number of triangles in that graph which include that edge (where each triangle comprises 3 vertices, and each vertex is connected to the other two vertices by an edge representing a respective sub-SPtpl spacing. Each triangle represents three circuit patterns, among which each is separated from the other two by respective spacings less than SPtpl.

As defined herein, two vertices are said to be "coloring conformable" when they both connect to the two terminals of one edge. When two vertices are coloring conformable, the TEW of the edge 3 to which they are both connected is greater than one. Two vertices (e.g., edges c and d in FIG. 4D) are coloring-conformable if they both connect to the two terminals of the same edge. For example, in FIG. 4D, the edge 61 is included in two triangles: triangle a-b-c and triangle a-b-d. Thus, the TEW of edge 61 in FIG. 4D is 2, because the number of triangles in the graph 60 which includes edge 61 is two.

Figure 4D:
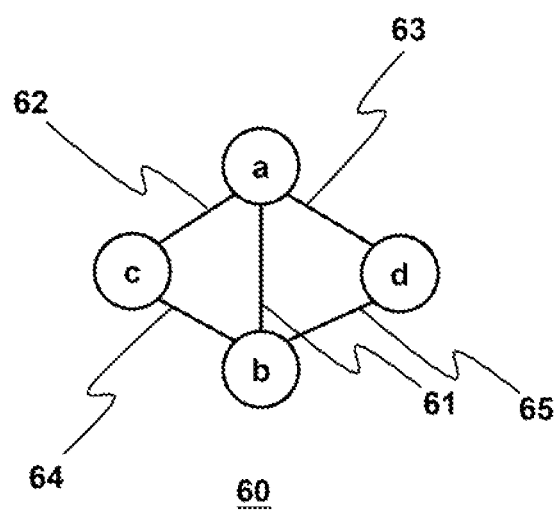
FIG. 4D depicts a triangular edge weight computation within a conflict graph in accordance with an embodiment.

In FIG. 4D, the TEW of the edge 61 formed between the vertices "a" and "b" is two, indicating that the vertices a and b and the edge 61 connecting them are shared by two sets of patterns, where each of the two sets of patterns includes three circuit patterns, among which each is separated from the other two by respective spacings less than SPtpl. Therefore, according to the definition of "coloring conformable," the edge 61 is included in two triangles: triangle a-b-c and triangle a-b-d; the TEW of edge 61 is therefore two; vertices c and d both have edges connected to the terminal vertices (a and b) of edge 61; so the coloring relation of the two terminal vertices "c" and "d" is coloring conformable.

FIG. 4D shows a conflict graph 60 constructed from a layout (not shown). Circuit patterns in the layout are represented in the conflict graph 60 by vertices a-d. Each sub-SPtpl separation between a pair of adjacent vertices is represented by an edge 61-65 in the conflict graph 60. Coloring conformable vertices are vertices that can be merged into a single vertex in a simplified graph to facilitate the analysis described herein. If two vertices (e.g., c and d in FIG. 4D) are both connected by intervening edges to the two terminals of the same edge (e.g., edge 61 in FIG. 4D) the two vertices (c, d) are said to be coloring-conformable. For example, the two vertices c and d in FIG. 4D both connected by intervening edges 61-64 to the terminals a, b of the same edge 61. In this example, the two terminals of edge 61 are located at vertices a and b, and the vertices c and d is connected by respective edges 62 and 63 to vertex a and by 64 and 65 to vertex b. Thus vertices c and d meet the definition of coloring conformable vertices.

Figure 5:
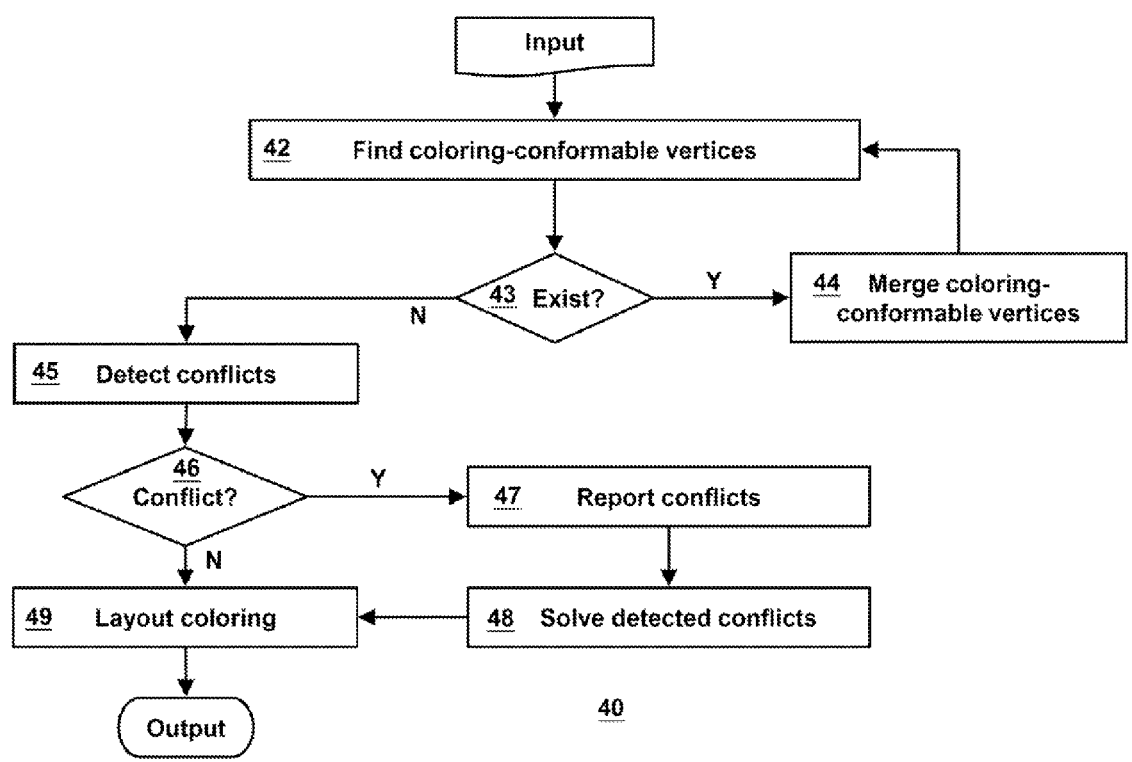
FIG. 5 depicts a method of TPL conflict detection and resolution in accordance with an embodiment.

FIG. 5 is a flow chart depicting a method 40 for conflict detection and solution. During the analysis described herein and shown in FIG. 5, all coloring conformable pairs of vertices within a conflict graph are merged into a merged vertex. Two or more patterns corresponding to vertices which are merged into a merged vertex of the reduced graph are checked for conflicts. (Note that the definition of "coloring conformable" does not guarantee that there will not be any conflicts between any two of the original vertices merged into the final merged vertex). Within a merged vertex according to this method, if any two patterns are separated from each other by a sub-SPtpl spacing, a "primary conflict" is identified, indicating that those two patterns cannot be assigned to the same mask. By identifying two or more vertices of the original conflict graph which can be merged into a merged vertex of the reduced graph, the method facilitates identification of a smaller set of pairs of vertices to be evaluated for triple patterning conflicts. Thus, the merged vertex represents two or more candidate patterns for inclusion in a same one of the photomasks. The merged vertex also serves as a vehicle for identifying the primary conflicts the designer should resolve first, to reduce the complexity of, or eliminate, remaining (secondary) conflicts.

At step 42, after an input layout (for an IC design such as layout 10 in FIG. 1) is received, the method searches for "coloring conformable" vertices, as defined above with reference to FIG. 4D.

At step 43 of FIG. 5, if coloring-conformable vertices are found, step 44 is performed. If none is found, step 45 is performed.

At step 44, if a pair of coloring-conformable vertices is found, the coloring-conformable vertices are merged. That is, the coloring-conformable vertices are merged into (i.e., replaced by) a single vertex for display on a reduced version of the conflict graph ("reduced graph") to facilitate identification of triple patterning conflicts in a conflict graph. A reduced graph is a graph having each of the coloring-conformable vertices merged into respective single vertices for each color into a simpler graph (see FIG. 7C). The search for coloring-conformable vertices is continued at step 42. Thus, additional original vertices can be merged into a merged vertex.

At step 45, if no further coloring-conformable vertices are found, then the method searches for conflicts in the reduced graph.

At step 46, a determination is made whether there is a conflict, using the reduced graph. If a conflict is found, steps 47-48 are performed. If there is no conflict, step 49 is performed.

If a conflict exists at step 46, then the conflict is reported as a primary or secondary conflict at step 47, for example as illustrated in FIGS. 7C and 7D. A primary conflict is defined as a case in which two of the vertices which have been merged into a single vertex in the reduced conflict graph are connected by an edge in the original conflict graph. For example, in FIGS. 7A-7C, the layout 71 of FIG. 7A is represented by the conflict graph 72 of FIG. 7B. Vertices a and f are coloring conformable vertices and can be merged; Vertices a and g of FIG. 7B are also coloring conformable vertices and can be merged. Thus vertices a, f and g are merged into vertex A of the graph 73 of FIG. 7C.

Note that, based on the same definitions, vertices f and g are not a coloring conformable pair. Vertex f is connected to two edges 72G and 72H that are included in two triangles and have a TEW of 2. Vertex g is connected to two edges 72I and 72J that are included in two triangles and have a TEW of 2. None of the edges 72G, 72H, 72I or 72J is connected to both vertices f and g. Thus, vertices f and g are not both connected to the terminals of any edge having a TEW of 2, and vertices f and g cannot be assigned to the same mask as each other without any conflict (even though they are merged into a single vertex A at this stage of the analysis).

The handling of a pair of non-coloring conformable vertices merged into a single vertex is described below with reference to FIGS. 9 and 10.

Coloring conformable vertices b and d of FIG. 7B are merged into vertex B of the graph 73 of FIG. 7C.

Coloring conformable vertices c and e of FIG. 7B are merged into vertex C of the graph 73 of FIG. 7C. Also, coloring conformable vertices c and h of FIG. 7B are merged into vertex C of the graph 73 of FIG. 7C. Vertices e and h are not coloring conformable, because of relationships similar to those described above in the case of vertices f and g. The vertices e and h are connected by an edge 72M in the graph 72 of FIG. 7B. Thus, vertices e and h cannot be assigned to the same mask as each other without any conflict (even though they are merged into a single vertex C at this stage of the analysis).

In this example, the vertices f and g within the merged vertex A are connected by a vertex 72O in FIG. 7B, indicating a sub-SPtpl spacing. Similarly, the vertices e and h within the merged vertex C are connected by a vertex 72M in FIG. 7B, indicating a sub-SPtpl spacing. Thus, the vertices 72O and 72M present primary conflicts, because each represents a respective pair of vertices (f and g; e and h) which have been merged into a respective single vertex (A or C) in the reduced graph 73 but are connected by an edge (72O, 72M) in the original conflict graph 72.

In this situation, the merged vertex in the reduced graph represents two vertices with a sub-SPtpl edge connecting them, and is referred to below as "self-connected". FIG. 7C shows a graphical representation of the self-connected merged vertices A and C. The loops 73A and 73C are graphical indicators of self-connected vertices A and C, respectively and in some embodiments, the computer implemented tool displays these loops 73A and 73C in the reduced graph 73 on a display device for ease of identification. A self-connected vertex (A or C) in the reduced graph 73 indicates that two adjacent vertices in the conflict graph 72 connected by an edge have been assigned to the same color at this stage of the analysis. For example, two adjacent circuit patterns separated by less than SPtpl from each other are assigned to be formed using the same photomask.

Referring again to FIG. 5, at step 48, the detected conflicts are resolved (by, for example, pattern shifting, stitch inserting, or re-routing). Pattern shifting refers to or involves the exposure of a photoresist for patterning a layer of an IC using a photomask, shifting the mask relative to the substrate, and using the same photomask to again expose the same layer. Stitch insertion involves exposing a first portion of a single circuit pattern or line with a first mask and exposing a remaining portion of the same circuit pattern or line with a second mask, with a small overlap region exposed by both masks. Re-routing involves re-routing the pattern having the sub-minimum separation such that the sub-minimum separation no longer exists. If no conflict is found at step 46 or if the conflicts are resolved at step 48, then at step 49 the circuit patterns of the layout are assigned to respective photomasks (i.e., colored), before providing an output file with mask assignment data, to be used for generating photomasks to pattern the integrated circuit layer, to implement the layout by TPL.

Figure 6:
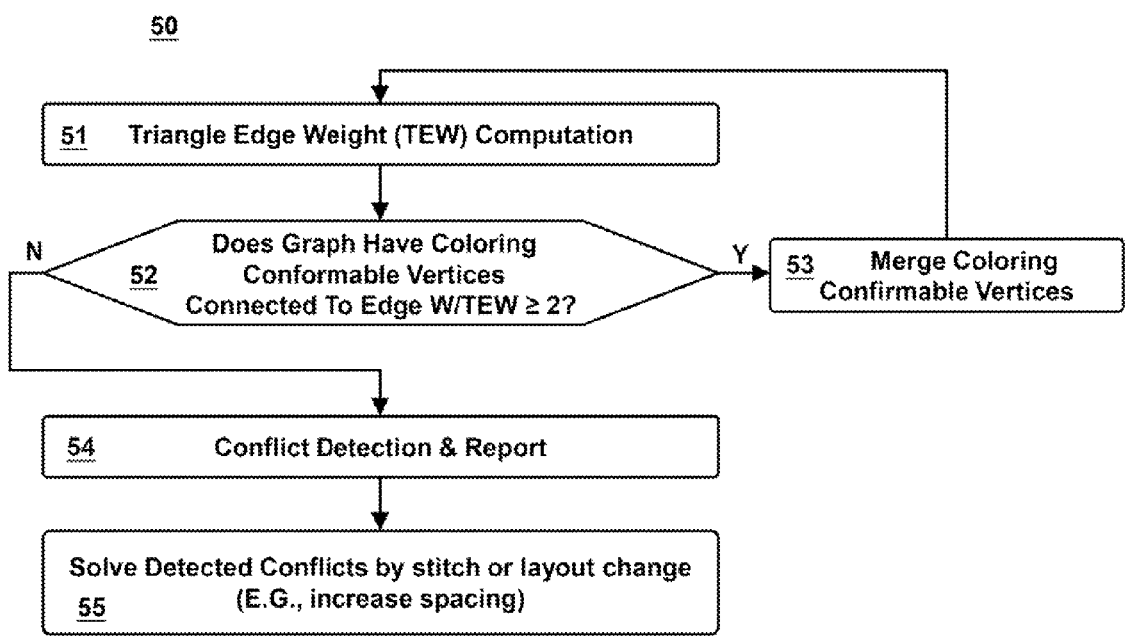
FIG. 6 depicts another method of TPL conflict detection and resolution in accordance with an embodiment.

FIG. 6 illustrates a flow chart of some embodiments of a method 50 of TPL conflict detection and solution. The method 50 involves a triangular edge weight (TEW) computation and merger of coloring-conformable vertices as described above with reference to the graph 60 of FIG. 4D. The merging of coloring-conformable vertices involves the replacement of 2 or more nodes (or vertices) in a conflict graph by a single node or vertex in a reduced graph (see FIGS. 7B and 7C).

At step 51, a triangular edge weight (TEW) computation is performed. For a given edge within the graph, the number of triangles in that graph which include that edge is determined; that number is the TEW for that edge. The respective triangle edge weight is determined for each respective edge in the graph.

At step 52, a determination is made whether the graph has a pair of vertices connected to the terminals of an edge with a TEW that is at least two. As described above, two vertices connected by edges to the terminals of the same edge with a TEW greater than or equal to two are by definition, "coloring conformable." If the graph has a pair of coloring conformable vertices, step 53 is performed. If there is no coloring conformable edge, step 54 is performed.

At step 53, two coloring conformable vertices of the conflict graph are merged. Following step 53, steps 51 and 52 are repeated, based on the graph with the merged vertex substituted for two coloring conformable vertices. Steps 51-53 are repeated, until no more coloring conformable indices are found in the graph during step 52.

If no coloring conformable edges remain (i.e., none of the edges in the graph has a TEW larger than one), then the method moves on to step 54.

At step 54, conflict detection and reporting are performed.

Once the conflicts are detected, the conflicts can be solved at step 55 using one of a number of techniques, which can include stitching, re-routing, or by expanding spacing between two adjacent patterns.

Referring to FIGS. 7A-G, a TPL conflict detection and solution method is depicted graphically for patterns a-h from an input layout 71 as shown in FIG. 7A. The input layout 71 represents a circuit layout with each pattern a-h representing conductive lines and shapes in the form of polygons or patterns as explained above.

The input layout 71 of FIG. 7A and a conflict graph 72 of FIG. 7B are provided before coloring conformable vertices are merged into a reduced graph 73 where vertices a, f, and g are merged as "A", vertices b and d are merged as "B", and vertices c, e, and h are merged as "C". In the reduced graph, the three vertices A, B and C represent the original vertices a through g.

In FIG. 7B, the conflict graph 72 includes vertices a-g and edges 72A-72P. Vertices a and f are coloring conformable, for example, as explained with in FIG. 4D, since the two vertices a and f connect to the two terminals e and b of an edge 72F. Thus, the vertices a, f are said to be coloring-conformable. Vertices a and g are coloring conformable since the two vertices a and g connect to the two terminals h and d of an edge 72K. Thus, the vertices a, g are said to be coloring-conformable.

On the other hand, based on the same definitions, vertices f and g are not coloring conformable with each other. Vertex f is connected to two edges 72G and 72H that are included in two triangles and have a TEW of 2. Vertex g is connected to two edges 72I and 72J that are included in two triangles and have a TEW of 2. None of the edges 72G, 72H, 72I or 72J is connected to both vertices f and g. Thus, vertices f and g are not both connected to the terminals of any edge having a TEW of 2, and vertices f and g cannot be assigned to the same mask as each other without any conflict. Nevertheless, in the analysis described herein, the three vertices a, f and g can be merged into the vertex A at this point. Subsequently, the method detects and corrects any conflict in the merged vertex.

Accordingly, a, f, and g are merged as "A" in the reduced graph 73 of FIG. 7C. Coloring conformable vertices b and d of FIG. 7B are merged into vertex B of the graph 73 of FIG. 7C. Coloring conformable vertices c and e of FIG. 7B are merged into vertex C of the graph 73 of FIG. 7C. Also, coloring conformable vertices c and h of FIG. 7B are merged into vertex C of the graph 73 of FIG. 7C. Vertices e and h are not coloring conformable, because of relationships similar to those described above in the case of vertices f and g. Thus, merged vertex C is a self-connected vertex, as discussed above.

One primary conflict is detected between vertices f and g, which are separated by a spacing smaller than SPtpl, and cannot be assigned to the same mask, as indicated by edge 72O in FIG. 7B (and represented by the self-directed line 73A at A in FIG. 7C). Another primary conflict is detected between e and h, which are separated by a spacing smaller than SPtpl, and cannot be assigned to the same mask, as indicated by edge 72M in FIG. 7B (and represented by the self-directed line 73C at C in FIG. 7C). Detected conflicts are reported and can be represented by the colored conflict graph 74 having conflicts at edges 72M and 72O (that corresponds to edges 73A and 73C of FIG. 7C). The colored conflict graph 74 corresponds to the colored layout 76 of FIG. 7E.

The conflict graph 74 of FIG. 7D is used to solve the detected conflicts by pattern shifting or by stitching as shown in the modified conflict graph 75 of FIG. 7F.

As explained above, FIG. 7D shows a conflict graph 74 of the mask assignments ("colors") for the layout 71 before stitching. FIG. 7F shows a conflict graph 75 of the mask assignments ("colors") for the layout 71 after stitching. The pattern h of FIG. 7A is divided into two segments h1 and h2, as shown in FIG. 7G. Each of the segments h1 and h2 is assigned to a respectively different mask (color). The patterns h1 and h2 have a small overlap, referred to as a stitch, ensuring continuity regardless of registration errors between the masks used to form segments h1 and h2. The pattern f of FIG. 7A is divided into two segments f1 and f2, as shown in FIG. 7G. Each of the segments f1 and f2 is assigned to a respectively different mask. The patterns f1 and f2 have a small overlap, ensuring continuity regardless of registration errors between the masks used to form segments f1 and f2. FIG. 7G shows a colored layout 77 corresponding to the conflict graph 75 after stitching.

FIG. 7H is a conflict graph 75 of the colored layout after the two stitches are inserted. The conflict between vertices e and h is eliminated; vertex h1 has a different color (mask assignment) from vertices e and a; and vertex h1 has no edge connection to vertices d or g. The conflict between vertices f and g is eliminated; vertex f2 has a different color (mask assignment) from vertices c and g; and vertex f2 has no edge connection to vertices e or b. Thus, in this example, resolving the two primary conflicts by stitching (per FIG. 7G) eliminates all of the conflicts from the layout. Every vertex in FIG. 7F has a different color (mask assignment) from every other vertex to which it is connected by a respective edge.

Referring to FIG. 8A, a flow chart 80 (and corresponding conflict charts 8B-8E)) illustrate the process of merging coloring-conformable vertices. Step 82 begins by providing as an input two vertices v1 and v2 (such as "a" and "f" respectively of conflict graph 82A of FIG. 8B) that are coloring conformable vertices. Next, at step 84, all adjacent vertices of v2 are directly connected to v1 if they are not already directly connected. In the conflict graph 84A of FIG. 8C, "g" is the only adjacent vertex of v2 (or "f") that is not already connected to v1 (or "a"), thus a connection 85 is made between "a" and "g" as shown in FIG. 8C.

At step 86, the method removes all adjacent connections of v2 or "f" as represented in the conflict charts 84A of FIG. 8C and 86A of FIG. 8D where f's adjacent connections 85A, 85B, 85C, and 85D are removed. At step 88, v2 or "f" itself is removed before an output is provided having a layout of an integrated circuit. The conflict graph 88A of FIG. 8E corresponds and reflects step 88 by showing the removal of v2 or "f".

Figure 9:
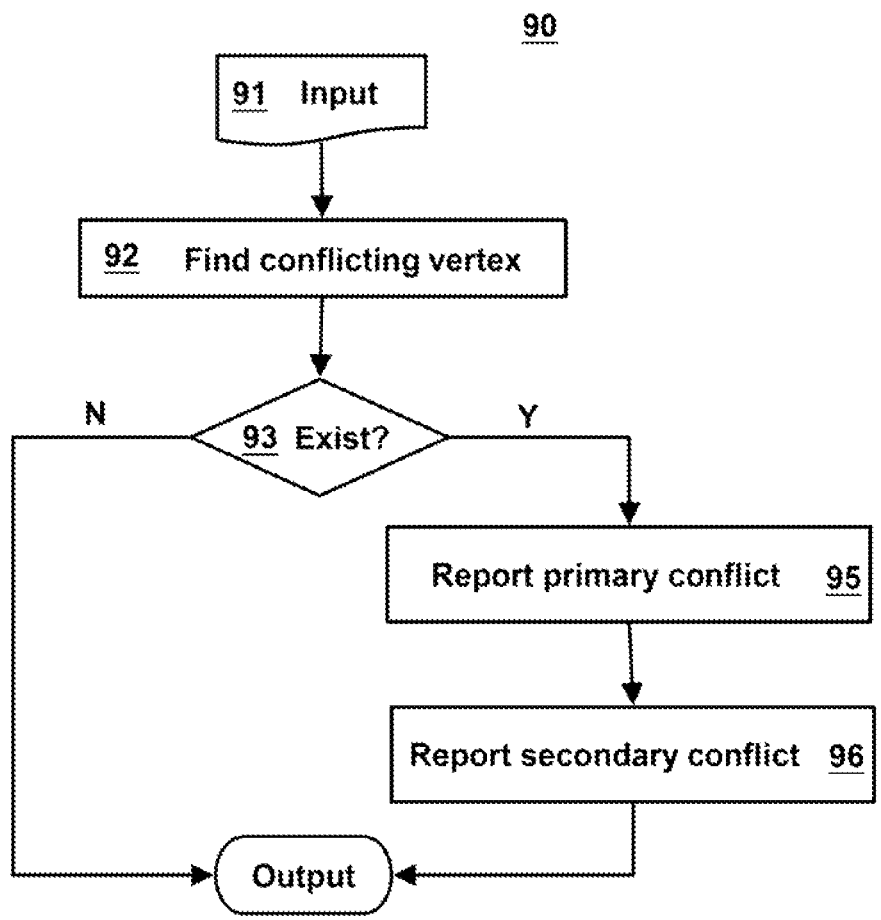
FIG. 9 is a flow chart illustrating a method of conflict detection and reporting in accordance with an embodiment.
Figure 10:
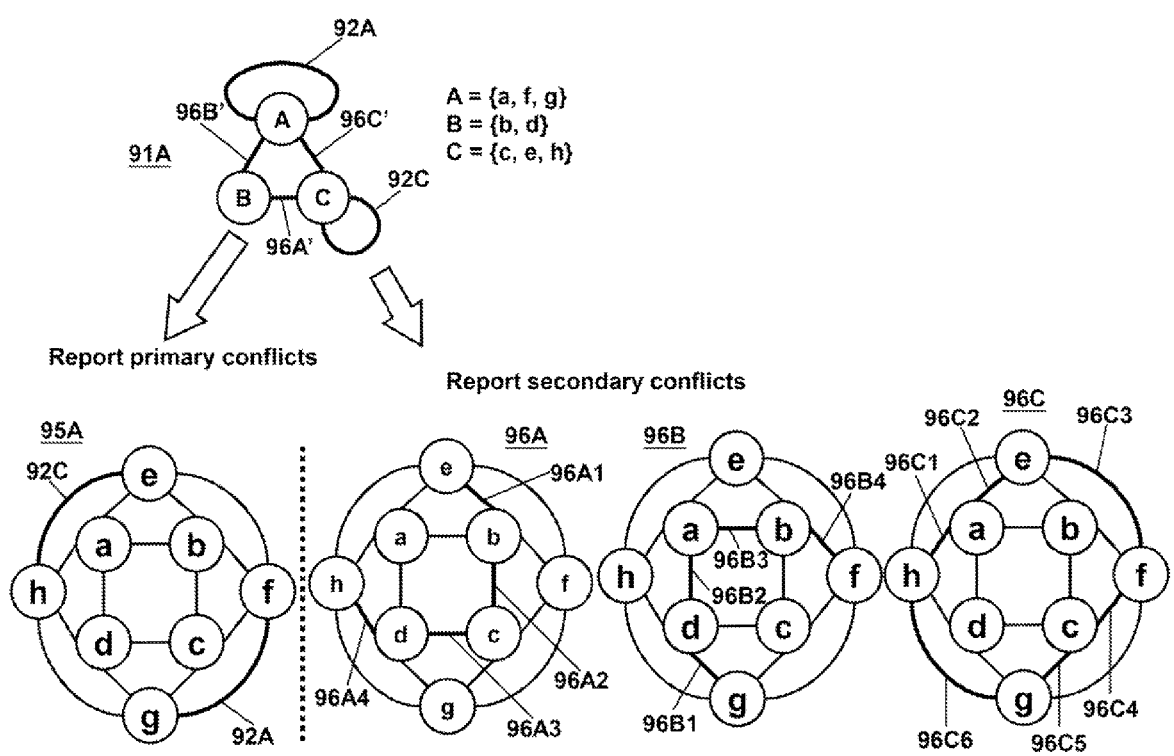
FIG. 10 depicts a number of conflict graphs representing a conflict detection and reporting example in accordance with an embodiment.

Referring to FIGS. 9 and 10, a flow chart of a conflict detection and reporting method 90 includes providing an input at step 91 such as a conflict graph and finding conflicting vertex (such as a self-connected vertex in a reduced conflict graph) or vertices at step 92. As shown in FIG. 10, a self-connected vertex 92A in the reduced conflict graph 91A represents a primary conflict in the form of a direct connection between vertices f and g in the conflict graph 95A. Similarly, the self-connected vertex 92C in the reduced graph 91A represents another primary conflict in the form of the direct connection between vertices e and h in the conflict graph 95A.

The conflict graphs 96A, 96B, and 96C of FIG. 10 show secondary conflicts which represent all the edges (direct connections) between the vertices of the reduced conflict graph 91A. A secondary conflict is a case in which two adjacent patterns are separated by a distance less than SPtpl, but are not merged into the same merged vertex as each other, so the patterns are not currently assigned to be patterned using the same photomask. For example, edge 96A' in the reduced conflict graph 91A represents all the edges between any one of the original vertices b, d (which were merged into vertex B), and any one of the original vertices c, e, and h (which were merged into vertex C), i.e., edges 96A1, 96A2, 96A3, and 96A4 in conflict graph 96A. If any adjacent pair of patterns within the set e, b, c, d, h having a sub-SPtpl spacing are both assigned to the same photomask, a conflict would exist. Thus, a secondary conflict represents a situation in which a conflict can occur in the event that two patterns are assigned to the same mask. A secondary conflict essentially provides a warning that two adjacent patterns currently assigned to different photomasks should not be re-assigned to the same mask. Thus, adjacent vertices connected to any one of the edges 96A1, 96A2, o6A3, 96A4 should not be re-assigned to the same mask as each other. Connection 96B' in the reduced conflict graph 91A represents all the edges between any one of the original vertices a, f, and g (which were merged into vertex A), and any one of the original vertices b and d (which were merged into vertex B), i.e., edges 96B1, 96B2, 96B3, and 96B4 in conflict graph 96B. Thus, adjacent vertices connected to any one of the edges 96B1, 96B2, 96B3, and 96B4 should not be re-assigned to the same mask as each other. Connection 96C' in the reduced conflict graph 91A represents all the edges between any one of the original vertices a, f, and g (which were merged into vertex A), and any one of the original vertices c, e, and h (which were merged into vertex C), i.e., edges 96C1, 96C2, 96C3, 96C4, 96C5, and 96C6 in conflict graph 96C. Thus, adjacent vertices connected to any one of the edges 96C1, 96C2, 96C3, 96C4, 96C5, and 96C6 should not be re-assigned to the same mask as each other.

At decision block 93 of FIG. 9, if no conflicting vertex exists, then an output is provided in the form of a layout for a particular integrated circuit design.

If a conflict exists at step 93, then primary conflicts (e.g., adjacent vertices "f" and "g" of C and adjacent vertices "e" and "h" of A) are reported at step 95 and then secondary conflicts are reported at step 96 before an output is provided. The step of reporting the primary conflicts includes reporting patterns that cause the conflicts. The step of reporting the secondary conflicts involves reporting patterns to breakdown the coloring relation of conflicting patterns. The reporting of conflicts can be reported and ultimately accessible to a circuit designer in a number of forms including a listing of edges stored in a file. The conflict reporting can also come in the form of a graphical output on a display representing the conflicts. See, for example, FIG. 10, where vertex "A" and vertex "C" are self-connected vertices and where primary conflicts are reported in conflict graph 95A. Secondary conflicts are reported in conflict graphs 96A, 96B, and 96C for each individual photomask (color).

Figure 11B:
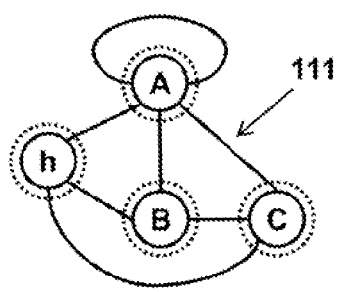
FIGS. 11A-D depict a flow chart and corresponding conflict charts illustrating a method of vertex merging in accordance with an embodiment.
Figure 11C:
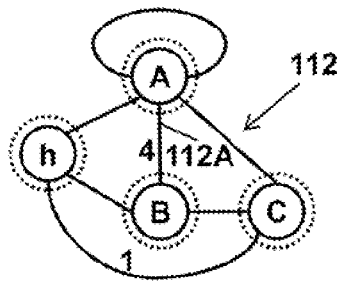
Figure 11D:
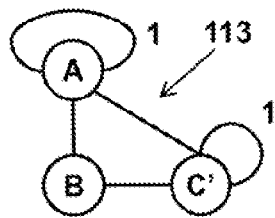
Figure 11A:
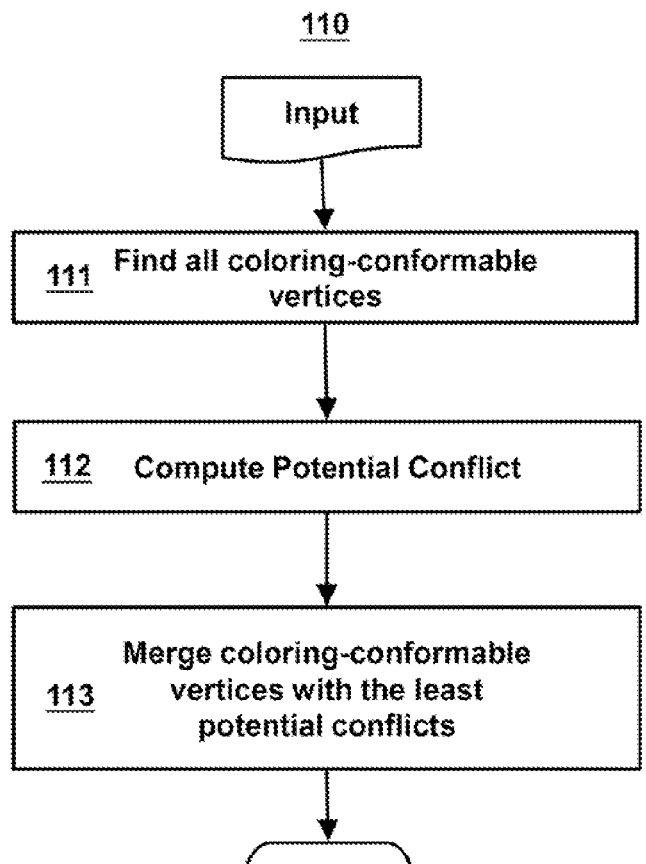

FIG. 11A is a flow chart depicting a method 110 of vertex merging and FIGS. 11B-11D illustrate corresponding conflict graphs. representing the various steps in the method. The method 110 begins with an input conflict graph and proceeds with finding all coloring-conformable vertices at step 111.

At step 112, the number of potential conflicts are computed. Conflicts are computed, for example, by counting the edge numbers represented by the edges between two coloring-conformable vertices. For example, the number of potential conflicts between vertices A and B at edge 112A with further reference back to FIG. 10 is the total number of edges 96B1, 96B2, 96B3, and 96B4 amounting to 4 edges.

At step 113, the method merges coloring-conformable vertices with the least potential conflicts before providing an output in the form of a design layout. A few merging examples are described below with reference to FIGS. 12-14.

Figure 12:
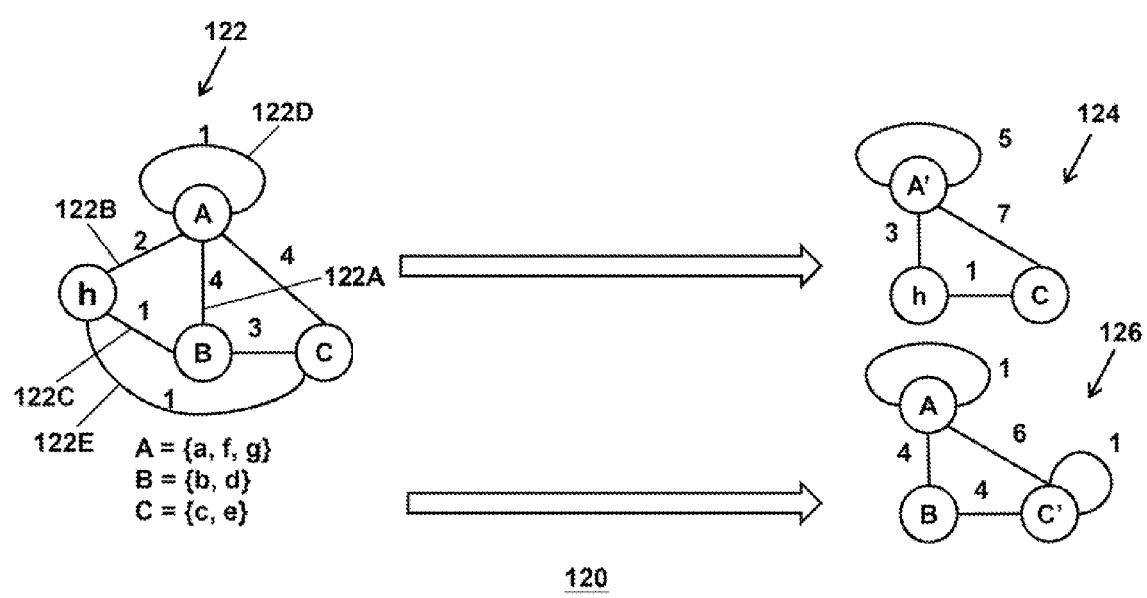
FIG. 12 depicts conflict charts illustrating another method of vertex merging in accordance with an embodiment.

FIG. 12 illustrates a vertex merging example 120, in which one edge between two coloring-conformable vertices presents one or more potential coloring conflicts in the conflict graph 122. Each edge records the number of potential conflicts (shown in numbers adjacent to the segments). For example, edge 122A has 4 potential conflicts, edge 122B has 2 potential conflicts, and edge 122C has 1 potential conflict. Then, coloring-conformable vertices are merged based on potential conflicts. One merger 124 would merge A and B into A' where A' would have 5 potential conflicts corresponding to edges 122A and 122D and resulting in the self-connected vertex A'. Another merger 126 is shown, where h and C are merged into C' resulting in only 1 potential conflict at A and 1 potential conflict at C'. In merger 126, the self-connected vertex A has only 1 potential conflict corresponding to edge 122D and self-connected vertex C' only has one potential conflict corresponding to edge 122E.

Figure 13:
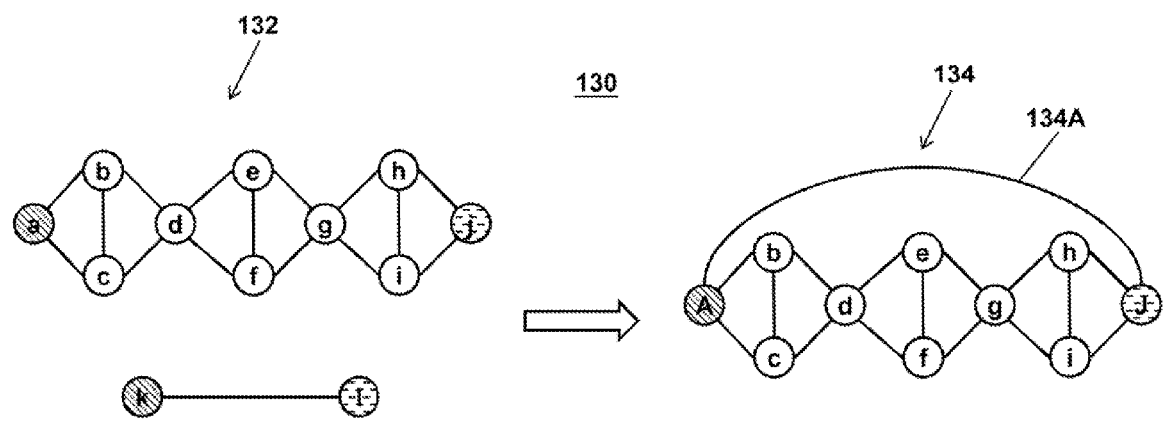
FIG. 13 depicts conflict charts illustrating a method of merging vertices when pre-determined masks are used in accordance with an embodiment.

FIG. 13 illustrates a "pre-coloring" problem in an application of merging vertices. "Pre-coloring" is the selection by the designer or foundry of the particular mask assignment (color) of two or more patterns to one or more photomasks, before the conflict analysis and mask assignment methods described herein are performed. Thus, in the example shown, some patterns such as "a" and "k" as well as "j" and "l" have pre-determined masks in the conflict graph 132. The vertices with identical pre-assigned colors are merged into one vertex. In this example, "a" and " "k" are merged into one vertex "A," and "j" and " "l" are merged into one vertex "L" in the resulting merged conflict graph 134. After merging vertices, one edge 134A directly connects between the vertices A and J that have been pre-colored to have different colors (or mask assignments). Accordingly, as shown, the edge 134A is added between "A" and "J".

Figures 14A, 14B:
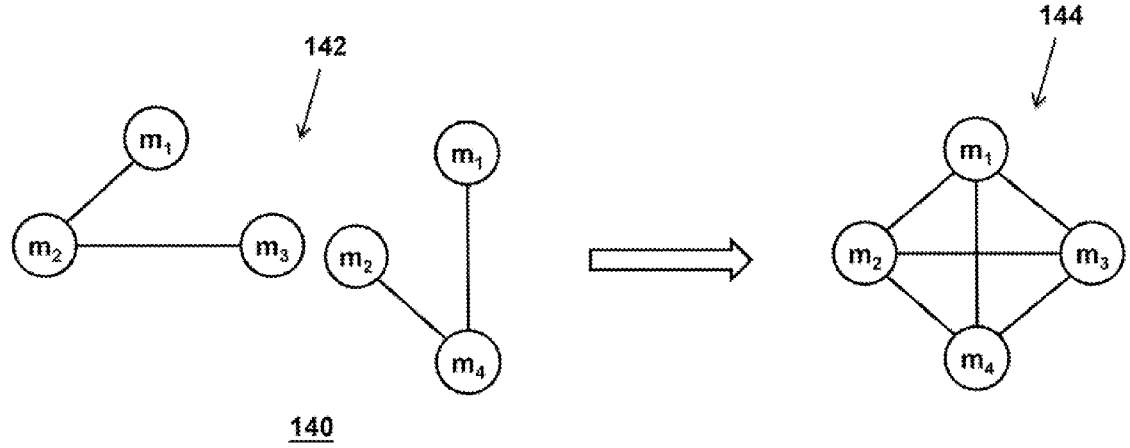
FIGS. 14A and 14B depicts graphs illustrating a method of merging vertices when group markers are assigned to the same mask in accordance with an embodiment.

FIGS. 14A and 14B illustrate a "pre-grouping" problem in an application of merging vertices. "Pre-grouping" involves selection by the designer (or foundry) of two or more patterns that are to be formed by the same photomask as each other (without regard to what other patterns will or will not be formed by the same photomask). In some embodiments, a designer (or foundry) can designate two or more patterns to be pre-grouped by viewing a layout or a conflict graph of the layout on a display, and using a pointing device, selecting the pre-grouped patterns. In some embodiments, the selection is indicated by displaying a "group marker," on each of the selected patterns, i.e., an indicator that all of the patterns having the group marker are pre-grouped to be assigned to the same photomask as each other. A group marker designates assignment of patterns to a group, but the group marker is not associated with any specific mask.

In some embodiments, two or more pre-groupings can be applied. The designer selects a first grouping of two or more patterns to be formed on the same mask as each other. The designer selects a second grouping of two or more patterns to be formed on the same mask as each other. The designer can decide whether or not the first grouping and the second grouping include one or more patterns in common, at the designer's discretion. In some embodiments, each pre-grouping has a unique marker with a distinct visual appearance.

Note that FIG. 14A is not a conflict graphs. FIG. 14A show groupings (not conflicts). FIG. 14B is a conflict graph. Each line connecting a pair of the patterns m1-m4 indicate that the designer has selected that pair of patterns to be formed by the same mask as each other (and does not indicate whether or not the vertices are separated by a sub-SPtpl spacing).

Thus, as shown in the example 140, a group of patterns sharing the same group markers as each other are assigned to the same mask in the conflict graph 142, and then the vertices having the same markers are merged as shown in the conflict graph 144 of FIG. 14B. For example, as shown in FIG. 14A, the designer selects the patterns m1 and m2 and assigns them a first group marker; and the designer selects the patterns m2 and m3 and assigns them the first group marker. The designer also selects the patterns m2 and m4 and assigns them a second group marker; and the designer selects the patterns m4 and m1 and assigns them the second group marker. Because the two groupings include at least one vertex in common (m1 and m2 are included in both groupings), the union of the groupings specified by the designer includes all of the patterns m1-m4, within a single mask, as shown in the conflict graph of FIG. 14B. Because of the respective spacings, each pattern m1-m4 is separated from each of the other patterns m1-m4 by less than SPtpl.

The method of merging vertices described herein can be used to determine whether the pre-grouping scenario described above would create a triple patterning conflict. The methods described above with reference to FIGS. 5 and 6 are performed. Thus, within each grouping, each pair of the vertices having the same grouping can be merged into a merged vertex if the pair of vertices are coloring conformable in the same manner described above with respect to FIGS. 4D and 7A-7G. If any merged vertex is self-connected as described above with reference to FIG. 7C, a primary conflict is identified within that grouping.

Figure 15:
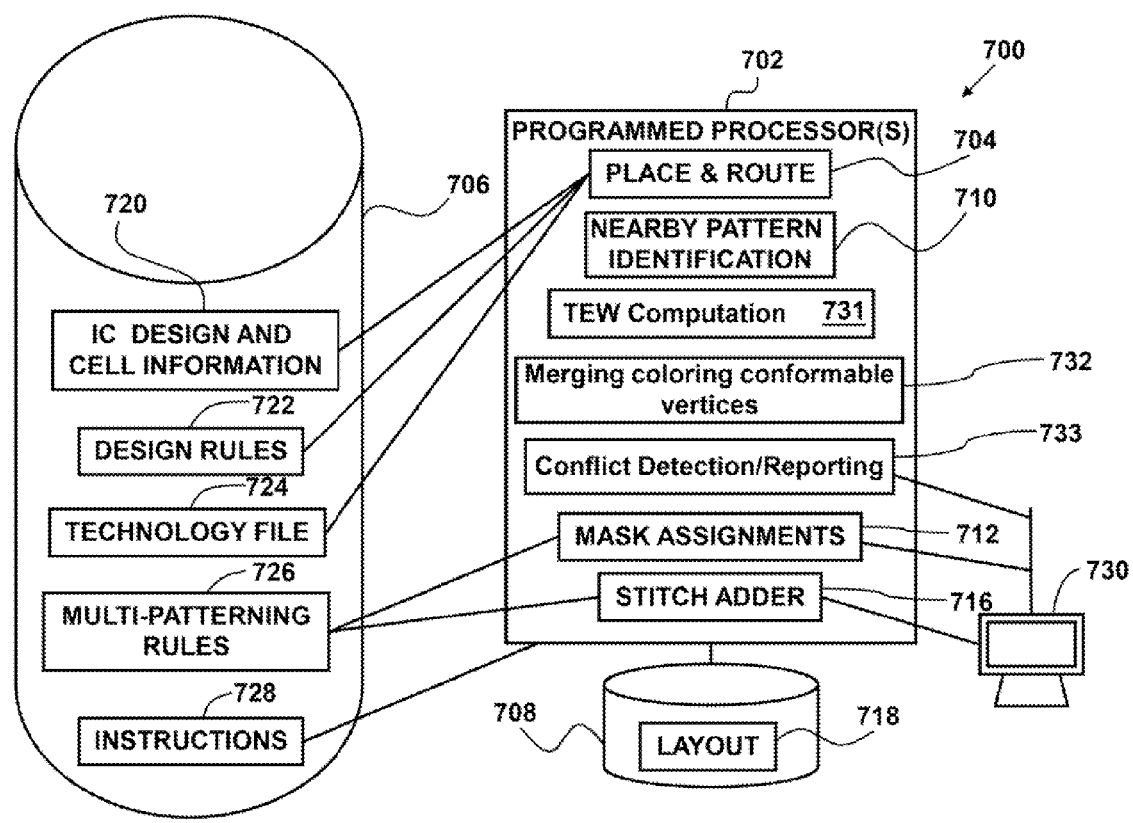
FIG. 15 is a block diagram of an embodiment of a system for inserting stitches into the various layouts disclosed in the figures above.

FIG. 15 is a block diagram of an embodiment of a system 700 for performing the method described above.

System 700 includes at least one non-transitory, computer readable storage medium 708 for storing data representing a layout 718 of a layer of an integrated circuit (IC) comprising a plurality of polygons defining circuit patterns to be divided among a number (N) of photomasks for multi-patterning a single layer of a semiconductor substrate, where N is greater than one. Either the same storage medium 708 or a different storage medium 706 stores data and instructions used by the EDA tool 702. These data and instructions include, but are not limited to IC design and cell information 720, design rules 722, technology file 724, additional multi-patterning design rules 726, and software program instructions 728. The instructions can further include according to various embodiments, a software module 731 for computing a TEW calculation, a software module 732 for merging coloring conformable vertices, and a software module 733 for detecting and reporting conflicts. The software module 731, includes, for example, instructions for computing the TEW calculation associated with step 51 of method 50 of FIG. 6. The software module 732, includes, for example, instructions for merging coloring conformable vertices as described with respect to step 44 of method 40 in FIG. 5, step 52 of method 50 of FIG. 6, or step 113 of method 110 of FIG. 11A.

System 700 includes an electronic design automation ("EDA") tool 702 such as "IC COMPILER"™, sold by Synopsys, Inc. of Mountain View, Calif., which may include a place and route tool 704, such as "ZROUTE"™, also sold by Synopsys. Other EDA tools 702 may be used, such as the "VIRTUOSO"™ custom design platform or the Cadence "ENCOUNTER"® digital IC design platform may be used, along with the "VIRTUOSO" chip assembly router, all sold by Cadence Design Systems, Inc. of San Jose, Calif.

In some embodiments, EDA tool 702 is a special purpose computer formed by retrieving stored program instructions from a non-transient computer readable storage medium 706, 708 and executing the instructions on a general purpose processor. Examples of non-transient computer readable storage mediums 706, 708 include, but are not limited to, hard disk drives (HDD), read only memories ("ROMs"), random access memories ("RAMs"), flash memories, or the like. Tangible, non-transient machine readable storage mediums 706, 708 are configured to store data generated by the place and route tool 704.

The router of the place and route tool 704 is capable of receiving an identification of integrated circuit ("IC") design and cell information 720 (or interposer layout), including, for example, a netlist 720 containing pairs of cells within the plurality of cells to be connected to each other. Router 704 may be equipped with a set of default design rules 722 and technology file 724. Router 704 generates the custom interconnect routing lines and vias for interconnecting the various devices of the IC.

A nearby-pattern identification module 710 determines, for a given pattern, which other patterns are nearer than the minimum separation distance SPtpl. In some embodiments, the nearby-pattern identification module 710 identifies additional patterns which are spaced further apart from the given pattern than SPtpl, but are included in a sequence of patterns that are separated from each other or the given pattern by less than the SPtpl. In other embodiments, the nearby-pattern identification module 710 does not identify additional patterns which are spaced further apart from the given pattern than SPtpl, but are included in a sequence of patterns that are separated from each other or the given pattern by less than the SPtpl.

The mask assignment function 712 applies the MPT rules 726 and determines the initial assignment of each polygon to one of the photomasks. If any native conflicts are found (groups of polygons that cannot be divided among the available number of photomasks in any combination to avoid having two polygons closer to each other than the G0 distance), the native conflict is reported to the designer. For example, the native conflict is displayed on the display device 730, and the user prompted to make a modification to the layout to resolve the native conflict (e.g., by re-routing a connection between two pins, or by inserting a stitch).

A stitch adder 716 inserts additional stitches in the manner described above. The stitch adder also inserts stitches in patterns and/or portions of patterns that are separated from the nearest neighboring pattern by a distance greater than the minimum distance of patterning with a single mask. In other words, the stitch adder 716 inserts stitches in patterns that would not be stitched, if the criterion is to avoid having neighboring patterns on the same mask separated by a sub-G0 distance.

The stitch adder 716 is configured to assign the parts of each stitched polygon to respective photomasks according to the various methods described herein to resolve the primary conflicts and/or secondary conflicts.

EDA tool 702 indicates that one or more programmed processors may be included. In some embodiments, the processing load is performed by two or more application programs, each operating on a separate processor. In other embodiments, the processes are all performed using one processor. Similarly, two media 706 and 708 are shown, but the data may be stored in any number of media.

Although FIG. 15 shows an allocation of the various tasks to specific modules, this is only one example. The various tasks may be assigned to different modules to improve performance, or improve the ease of programming.

In the discussion above, reference is frequently made to polygons. One of ordinary skill understands that this is for brevity and ease of understanding. Nevertheless, each reference to a polygon is a reference to a pattern to be formed in a photomask for use in a semiconductor IC fabrication process. For example, an example of a pattern is a conductive line to be formed on the M1 conductive line layer of the interconnect structure of an IC. An IC includes a plurality of active devices on a semiconductor substrate and an interconnect structure having a plurality of conductive line layers above the substrate. The active devices are connected to each other and to external pins by the conductive lines in the conductive line layers. A given IC can have several (for example 8-14) conductive line layers, typically designated M1, M2, . . . $M_N$, where N is an integer greater than one. Other patterns can include more complex polygon shapes (e.g., polygon 11 in FIG. 1), with one or more angles, as shown in FIG. 1. These patterns are defined by a place and route tool. Thus, the polygons represent tangible patterns of material formed on a photomask to expose a substrate for forming circuits on a semiconductor substrate according to a designer's layout, and tangible IC circuit patterns formed in a semiconductor device using the photomask to form a layout.

The system and method described herein can identify and classify primary and secondary conflicts. A primary conflict is a present conflict based on a current set of candidate mask assignments. The method identifies the primary conflicts as the first conflicts a designer should resolve (e.g., through a stitch, or layout change). In some cases, resolution of the primary conflict by the designer can also eliminate or simplify secondary conflicts. Thus, a secondary conflict functions as a warning to the designer. When the solution to the primary conflict is selected, the designer can review the reported secondary conflicts and confirm whether they have been eliminated by the correction to the primary conflict. By identifying the secondary conflicts, the method prevents the designer from creating a new primary conflict while fixing an existing primary conflict.

In an embodiment, a method includes accessing data representing a layout of a layer of an integrated circuit (IC) comprising a plurality of polygons defining circuit patterns to be divided among a number (N) of photomasks for multi-patterning a single layer of a semiconductor substrate, where N is greater than two. The method further includes inputting a conflict graph having a plurality of vertices representing the circuit patterns, identifying a first vertex and a second vertex of the plurality of vertices, each of which is connected to a third vertex and a fourth vertex of the plurality of vertices, where the third and fourth vertices are connected to a same edge of a conflict graph, and merging the first and second vertices to form a reduced graph. The method further includes detecting at least one or more vertex in the reduced graph having a conflict.

In one aspect, the method further includes repeating the steps of identifying first and second vertices and merging the first and second vertices, where the first and second vertices are connected to a third vertex and a fourth vertex of the plurality of vertices, where the third and fourth vertices are connected to a same edge of the conflict graph, and where the repeating is performed until no further first and second vertices are found. In another aspect, the method further includes reporting at least one or more vertex in the reduced graph having a connection to itself as a primary conflict and detecting secondary conflicts from direct connections between vertices in the reduced graph. The method further performs layout coloring when no conflict is found or when a conflict is resolved. The method resolves a detected conflict for example, by performing one of pattern shifting, stitch inserting, or re-routing. In another embodiment, the method further includes resolving any detected conflict and assigning the circuit patterns of the layout to respective photomasks when the detected conflict is resolved. In yet another aspect, the method further includes computing a triangular edge weight (TEW) of a same edge where the TEW of the same edge indicates a number of triangles in the conflict graph abutting upon the same edge. In yet a further aspect, the steps of identifying the first and second vertices and merging the first and second vertices are repeated if the TEW of the same edge is greater than one and performing conflict detection and reporting if the TEW of the same edge is less than two.

In an embodiment, a system includes a non-transitory, computer readable storage medium for storing data representing a layout of a layer of an integrated circuit (IC) comprising a plurality of polygons defining circuit patterns to be divided among a number (N) of photomasks for multi-patterning a single layer of a semiconductor substrate, where N is greater than two and an EDA tool configured for inputting a conflict graph having a plurality of vertices representing the circuit patterns, identifying a first vertex and a second vertex of the plurality of vertices, each of which is connected to a third vertex and a fourth vertex of the plurality of vertices, where the third and fourth vertices are connected to a same edge of the conflict graph, merging the first and second vertices to form a reduced graph, and detecting at least one or more vertex in the reduced graph having a conflict. The EDA tool can be configured to repeat the steps of identifying first and second vertices and to merge the first and second vertices where the first and second vertices are connected to a third vertex and a fourth vertex of the plurality of vertices, where the third and fourth vertices are connected to a same edge of the conflict graph, and wherein the repeating is performed until no further first and second vertices are found. In one aspect, the EDA tool is configured to resolve a detected conflict by performing one of pattern shifting, stitching inserting, or re-routing. In another aspect, the reporting of the at least one or more vertex having the connection to itself is a reporting of a primary conflict. The EDA tool can be further configured to detect secondary conflicts from direct connections between vertices in the reduced graph. The system can further perform layout coloring when no conflict is found or when a conflict is resolved. In yet another aspect, the system computes a triangular edge weight (TEW) of a same edge where the TEW of the same edge indicates a number of triangles in the conflict graph abutting upon the same edge. Identifying the first and second vertices and merging the first and second vertices are repeated if the TEW of the same edge is greater than one and performing conflict detection and reporting if the TEW of the same edge is less than two.

In yet another embodiment, a non-transitory computer readable storage medium encoded with computer program instructions when executed causing the computer to perform operations including inputting a conflict graph having a plurality of vertices representing one or more circuit patterns, identifying a first vertex and a second vertex of a plurality of vertices, each of which is connected to a third vertex and a fourth vertex of the plurality of vertices, where the third and fourth vertices are connected to a same edge of the conflict graph, merging the first and second vertices to form a reduced graph, and detecting at least one or more vertex in the reduced graph having a conflict. In one aspect, the computer programming instructions when executed computes a triangular edge weight (TEW) of the same edge where the TEW of the same edge indicates a number of triangles in the conflict graph abutting upon the same edge. In a further aspect the computer programming instructions when executed resolve a detected conflict by performing one of pattern shifting, stitch inserting, or re-routing.

In some embodiments, a system comprises a non-transitory, computer readable storage medium for storing data representing a layout of a layer of an integrated circuit (IC) comprising a plurality of polygons defining circuit patterns to be divided among a number (N) of photomasks for multi-patterning a single layer of a semiconductor substrate, where N is greater than two.

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those of ordinary skill in the art.

What is claimed is:

1. A system comprising:
   a non-transitory, computer readable storage medium for storing data representing a layout of a layer of an integrated circuit (IC) comprising a plurality of polygons defining circuit patterns to be divided among a number (N) of photomasks for multi-patterning a single layer of a semiconductor substrate, where N is greater than two;
   an electronic design automation (EDA) tool configured for:
      inputting a first conflict graph having a plurality of vertices representing the circuit patterns and a plurality of edges representing spaces smaller than a predetermined distance between adjacent vertices;
      identifying first and second pairs of vertices within the plurality of vertices, as candidate circuit patterns for inclusion in a same one of the photomasks, the first pair including a first vertex, the second pair including a second vertex, the first and second pairs of vertices including a common third vertex;
      replacing the first, second, and third vertices with a single vertex to form a reduced conflict graph, the single vertex representing the circuit patterns corresponding to the first and second pairs of vertices; and
      identifying a multi-patterning conflict in the reduced conflict graph, if the first and second vertices are connected by one of the edges in the first conflict graph.

2. The system of claim 1, wherein the EDA tool is configured to repeat the steps of identifying first and second vertices and to replace the first and second vertices with a single vertex, wherein the first and second vertices are connected to a fourth vertex of the plurality of vertices, the third and fourth vertices are connected to a same edge of the conflict graph, and wherein the repeating is performed until no further first and second vertices are found.

3. The system of claim 1, wherein the EDA tool is configured to resolve a detected conflict by performing one of pattern shifting, stitching inserting, or re-routing.

4. The system of claim 1, wherein the identifying is indicated by displaying at least one or more vertex having a connection to itself as a reporting of a first-type of conflict.

5. The system of claim 1, wherein the EDA tool is configured to detect existence of a second type of conflict if there are edges between vertices in the reduced graph.

6. The system of claim 1, wherein the EDA tool is configured for performing layout coloring when no conflict is found or when a conflict is resolved.

7. The system of claim 1, wherein the EDA tool is configured for computing a triangular edge weight (TEW) of a same edge where the TEW of the same edge indicates a number of triangles in the conflict graph abutting upon the same edge.

8. The system of claim 7, wherein the EDA tool is configured for repeating the steps of identifying the first and second vertices and replacing the first and second vertices with a single vertex if the TEW of the same edge is greater than one and performing conflict detection.

9. A non-transitory computer readable storage medium encoded with computer program instructions, such that when the computer program instructions are executed by a computer, the computer performs the method comprising:
   inputting a first conflict graph having a plurality of vertices representing one or more circuit patterns and a plurality of edges representing spaces smaller than a predetermined distance between adjacent vertices into an electronic design automation (EDA) tool for assigning the circuit patterns to at least three masks for patterning a single layer of an integrated circuit, the plurality of vertices including a first pair of vertices containing a first vertex and a second pair of vertices containing a second vertex, the first and second pairs of vertices including a common third vertex;
   replacing the first, second, and third vertices with a single vertex to form a reduced conflict graph if the first and second pairs of vertices satisfy a predetermined criterion, the single vertex representing the circuit patterns corresponding to the first and second pairs of vertices; and
   identifying a multi-patterning conflict in the reduced conflict graph, if the first and second vertices are connected by one of the edges in the first conflict graph.

10. The non-transitory computer readable storage medium of claim 9, wherein the computer programming instructions when executed cause the computer to compute a triangular edge weight (TEW) of an edge in the conflict graph having a pair of terminal vertices, where the subset of the plurality of vertices are connected to the terminal vertices of the edge, and the TEW of the edge indicates a number of triangles in the conflict graph abutting upon the edge.

11. The non-transitory computer readable storage medium of claim 9, wherein the computer programming instructions when executed cause the computer to resolve a detected conflict by performing one of pattern shifting, stitch inserting, or re-routing.

12. A method comprising the steps of:
   inputting an input conflict graph representing an integrated circuit (IC) layout to an electronic design automation (EDA) tool for multi-patterning a single layer of the IC with at least three masks, the input conflict graph having a plurality of vertices representing respective circuit patterns separated from adjacent circuit patterns by less than a predetermined distance and a plurality of edges representing spaces smaller than the predetermined distance between adjacent vertices, the input conflict graph having a first pair of vertices including a first vertex, a second pair of vertices including a second vertex, the first and second pairs of vertices including a common third vertex;
   replacing the first vertex, the second vertex, and the third vertex with a single vertex to form a reduced conflict graph, the single vertex representing the circuit patterns corresponding to the first and second pairs of vertices;
   identifying a multi-patterning conflict in the reduced conflict graph, if the first and second vertices are connected by one of the edges in the input conflict graph; and generating a mask for resolving the multi-patterning conflict, based on the step of identifying.

13. The method of claim 12, wherein the step of detecting a multi-patterning conflict in the IC layout includes displaying one or more vertex in the reduced graph, represented by a connection to itself in the reduced graph as a first-type of conflict.

14. The method of claim 13, further comprising pre-grouping a subset of the circuit patterns, wherein the vertex having a connection to itself in the reduced graph indicates a multi-patterning conflict caused by the step of pre-grouping.

15. The method of claim 12, wherein the step of detecting a multi-patterning conflict in the IC layout includes detecting a conflict between two circuit patterns represented by the single vertex.

16. The method of claim 12, wherein the step of forming the mask includes one of pattern shifting, stitch inserting, or re-routing.

17. The method of claim 12, wherein the reduced graph has a first triangle and a second triangle sharing a common edge, the method further comprising merging two of the plurality of vertices that are included in the first triangle and the second triangle of the reduced graph, but are not located at ends of the common edge of the reduced graph, to further reduce a number of vertices in the reduced graph.

18. The method of claim 17, further comprising repeating the step of replacing two of the plurality of vertices that are included in a first triangle and a second triangle of the reduced graph by a single vertex, until the reduced graph no longer contains first triangle and the second triangle sharing any common edge.

19. The method of claim 18, wherein the step of forming a mask is performed when the reduced graph no longer contains a first triangle and a second triangle sharing any common edge.

20. The method of claim 12, further comprising detecting a second type of conflict from edges between vertices in the reduced graph.

* * * * *